May 20, 1952 — E. H. APPEL — 2,597,219
BALE LOADING MACHINE
Filed Oct. 17, 1947 — 2 SHEETS—SHEET 1
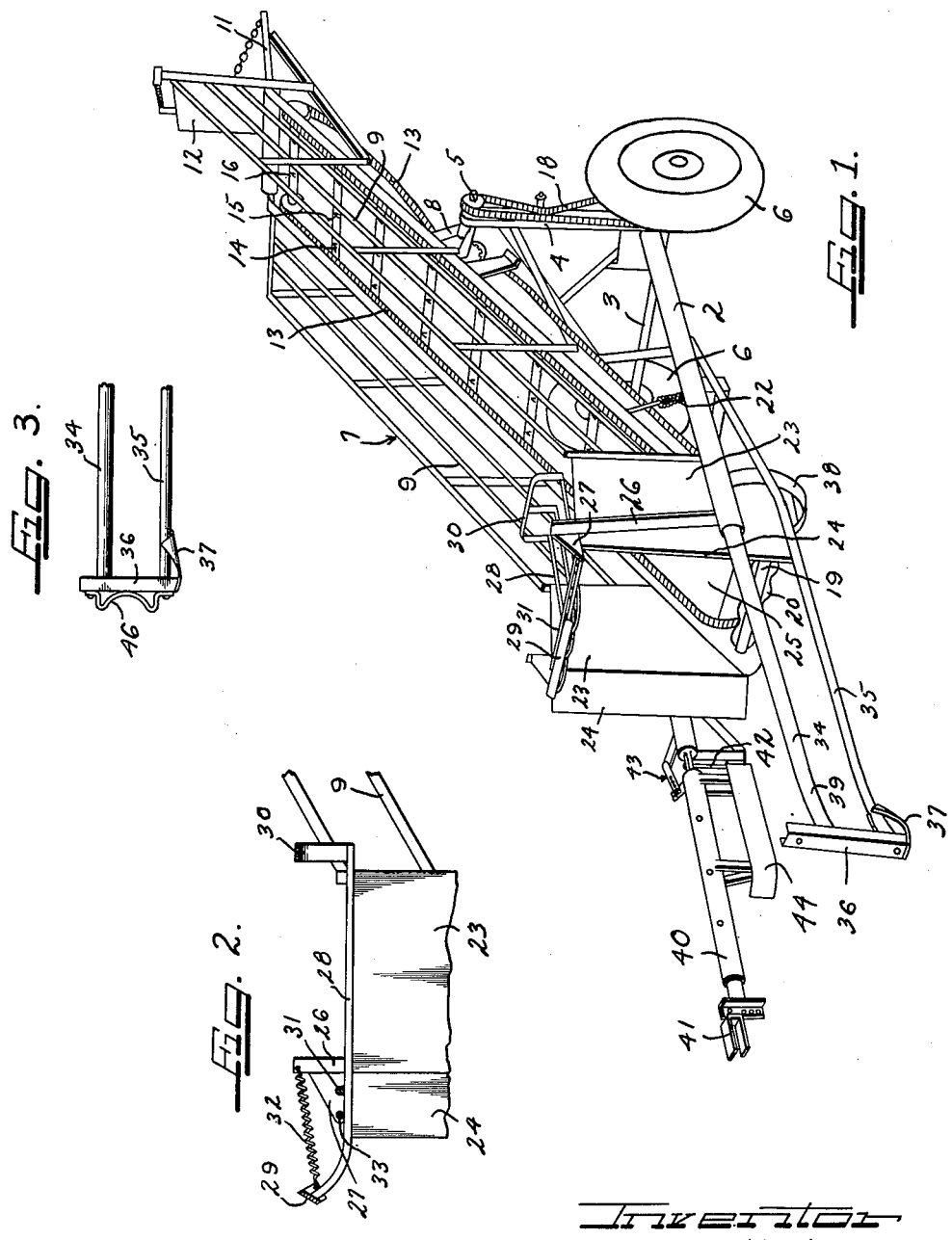
Inventor
EVERETT H. APPEL

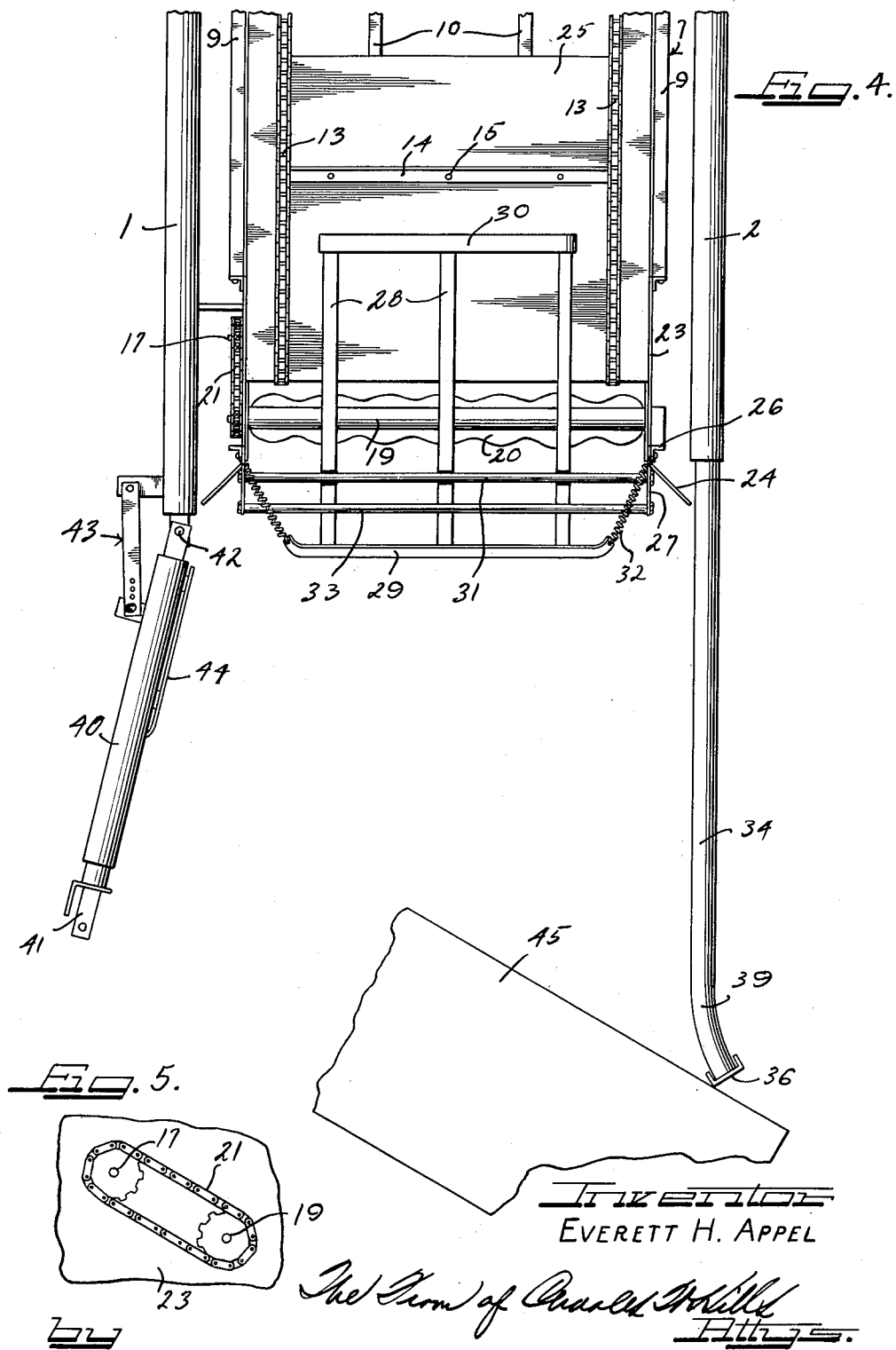

Patented May 20, 1952

2,597,219

UNITED STATES PATENT OFFICE 2,597,219

BALE LOADING MACHINE

Everett H. Appel, Aurora, Ill.

Application October 17, 1947, Serial No. 780,437

6 Claims. (Cl. 198—9)

This invention relates to improvements in a load straightening device for a loading machine, and more particularly to means for straightening a load of the character of a bale or shock so that it may properly be picked up by the loading machine as it moves along the ground, although the invention may have other uses and purposes as will be apparent to one skilled in the art.

The instant application is a continuation-in-part of my copending application entitled "Agricultural Loading Machine," filed April 19, 1944, Serial No. 531,693, issued in Patent No. 2,460,441, February 1, 1949.

In the past, many and various types of mobile agricultural loading machines, especially bale and shock loading machines, have been developed, and such machines were designed to operate upon both round and square bales, the latter term indicating a bale that is square or rectangular in cross section. These machines were constructed to be towed or driven adjacent to a transporting vehicle in the nature of a wagon, truck, or the like, so that after the bale had been elevated to a proper height by virtue of the loading machine, it would be transferred into the transporting vehicle. Difficulty was experienced, however, in the picking up of bales disposed at an angle to the path of travel of the loading machine and it was frequently necessary for the operator of the power vehicle to leave his seat, get down on the ground, and manually straighten a bale before the loading machine could pick it up. This, of course, was very aggravative and resulted in expensive and unwelcome delay in the harvesting of a crop. Insofar as I am aware, there has never been a loading machine produced that would by itself straighten and pick up a square bale with the long axis of that bale disposed in the neighborhood of 90° to the path of travel of the loading machine.

With the foregoing in mind, it is an important object of the instant invention to provide an agricultural loading machine equipped with straightening means designed to pick up any form of bale or shock disposed at any angle to the path of the loading machine without the aid of an operator.

A further object of this invention is the provision of a loading machine equipped with load straightening means projecting ahead of the loading machine in proper position to straighten and guide into the machine a bale disposed at substantially any angle to the path of travel of the machine.

A further feature of the invention resides in the provision of a loading machine equipped with load straightening means that will automatically straighten a bale disposed in a horizontal position at substantially any angle to the path of travel of the machine, or a bale standing on end.

Still another object of the invention is the provision of an agricultural loading machine equipped with load straightening means and a floating loading trough or conveyor for elevating the load, the straightening means projecting fixedly out in front of the lower end of the floating loading trough.

It is also an object of this invention to provide a loading machine for bales and the like equipped with means to insure the proper positioning of a bale upon the elevating conveyor, which means automatically prevent the bale descending the conveyor in the reverse direction due to rough ground or other difficulties in travel.

It is also a feature of this invention to provide a loading machine with automatic means to insure the positive gripping of a bale or other load by the elevating conveyor means.

While some of the more salient features, characteristics and advantages of the instant invention have been above pointed out, others will become apparent from the following disclosures, taken in conjunction with the accompanying drawings, in which Figure 1 is a view in projection of a loading machine embodying principles of the instant invention;

Figure 2 is an enlarged fragmentary vertical sectional view taken longitudinally of the structure of Fig. 1 in the upper forward portion thereof;

Figure 3 is a fragmentary side elevational view of the forward end of the device illustrating a slight change in construction to accommodate a round bale or load;

Figure 4 is an enlarged fragmentary top plan view of the front part of the structure of Fig. 1, illustrating diagrammatically the association of the device with a load that is disposed out of line; and Figure 5 is a fragmentary detail side elevational view inside the frame of the device taken from the left hand side of Fig. 4.

As shown on the drawings:

The illustrated embodiment of the instant invention comprises a mobile loading machine including a frame that may be of substantially any suitable construction, but is preferably formed in a manner in keeping with lightweight and more than ample rigidity, stability, and durability. In the illustrated instance the frame comprises a pair of opposed tubular metal side rails 1 and 2 connected at the rear end by means of a fixed axle 3. Extending upwardly from the frame portion is a pair of fixed spaced uprights 4, there being one upon each side of the structure, and any form of triangular and diagonal brace means may be used between these uprights. The two uprights carry an elevated transverse shaft 5 which is substantially directly above the fixed axle 3. Rotatable upon the journal ends of the axle is a pair of traction wheels 6—6 upon which the entire machine rides from place to place.

The detailed construction of the body portion of the loading machine is more specifically described in my aforesaid copending application, and herein it will therefore be necessary to only bring out the general features of this construction. It might also be noted at this time, that all metal frame portions, except where an adjustment or pivotal movement is desired, are preferably welded to each other to make a rigid and stable structure.

An inclined fabricated loading trough, generally indicated by numeral 7, is pivoted intermediate its ends to the shaft 5 as indicated at 8. This loading trough includes side portions 9—9 and a bottom comprising spaced flat metallic strips 10 as seen best in Fig. 4. At the top of this loading trough is a discharge platform 11 over which is a resiliently urged swingable guiding gate 12 to turn a bale or other load sidewise for discharge into the transporting vehicle. The structure of the discharge platform and guiding gate are more fully disclosed, described, and claimed in my copending application entitled "Discharge Arrangement for Agricultural Loading Machine," filed June 17, 1947, Serial No. 755,089.

In order to elevate loads up the inclined trough 7, this trough is provided with an endless conveyor in the form of a pair of spaced chains 13—13 connected together at intervals by means of transverse flights 14 each of which is equipped with one or more projecting pins or grabbers 15. Suitable sprocket wheels are provided at the upper and lower ends of the conveyor on shafts 16 and 17, respectively, the latter shaft being visible in Figs. 4 and 5. The conveyor is driven by means of a suitable chain and sprocket connection 18 (Fig. 1) from one of the wheels 6. Carried on the lower and forward end of the loading trough is a rotatable pick-up element comprising a shaft 19 provided with a pair of opposed undulating vanes 20, this pick-up element being driven from the conveyor as seen more clearly in Fig. 5 by a pair of sprocket wheels on the ends of shafts 17 and 19 and a chain 21.

During operation, the lower end of the loading trough floats above pick-up position so that the loading machine may travel over rough ground or from field to field, without danger of the pick-up member snagging the ground in depressions and other variations in ground surface. When a bale or other load is met by the machine, the pick-up member engages that load, travels down the load to pick-up position, and then elevates the load upon the conveyor where it is engaged by the projections 15 and carried up the trough. Immediately upon the load passing up the trough, the forward end of the trough again assumes elevated position. This is accomplished by way of a pair of opposed compression springs 22 (Fig. 1) on opposite sides of the machine.

In order to facilitate the entrance of a bale or other load upon the conveyor, the sides 9—9 of the loading trough terminate in a pair of guide plates 23—23 each of which terminates in a flaring wing 24 at the forward end thereof. Between these guide plates a smooth bottom plate 25 is disposed beneath the conveyor. With this arrangement, a bale or other load may smoothly enter upon the conveyor in position to be carried up the trough. These guide plates are supported firmly in position by means of a pair of opposed upright frame members 26 each of which has a forwardly extending bracket 27 on its upper end.

With the instant invention means are preferably provided to insure an adequate grip upon the bale by means of the projections on the conveyor flights, and to prevent a bale being jarred or otherwise bounced down the conveyor due to rough terrain or for any other reason. In the illustrated instance, these means find embodiment in the form of a pivoted bumper frame comprising a plurality of longitudinally extending strips 28 the forward ends of which are curved upwardly and connected transversely with the forward bumper bar 29 as best seen in Figs. 2 and 4. The rear ends of these strips are connected to an upright rear bumper bar 30. The entire bumper frame is carried on a transverse pivot shaft 31 journaled in the aforesaid brackets 27—27, and the forward end of the bumper frame is urged upwardly by means of a pair of opposed tension springs 32. The upward movement of the bumper frame is limited by means of a stop rod 33 extending transversely across the bumper frame forwardly of the pivot shaft 31.

This bumper frame arrangement performs three different functions in the elevating of a load. If a bale or other load is standing vertically on end upon the ground when the machine arrives to pick it up, the forward bumper bar 29 pushes the bale over upon its side into pick-up position. Then, as the pick-up member 19—20 elevates the adjacent end of the bale onto the conveyor, the bale must pass beneath the bumper frame which presses down on top of it by virtue of the action of the springs 32 to insure a positive engagement of the bale by the flights on the conveyor. After the bale has passed up the conveyor beneath the bumper frame, the rear portion of the frame drops behind the upwardly moving bale, and the rear bumper bar 30 effectively prevents any unexpected or unintended downward movement of that bale.

It frequently happens, however, that a bale may be disposed either vertically or upon its side but at an angle to the path of travel of the loading machine, so that if nothing else were done this bale could not be picked up by the loading machine because of its angular position. The instant invention comprises means for straightening such an angularly disposed bale, regardless of the angle at which it reposes. On one side of the machine these means include a member 34 forming an extension of the frame member 2, and beneath this member and secured to the frame member 2 at its rear end is a brace rod 35. Connecting the forward ends of the members 34 and 35 is a vertically disposed bumper 36, and a ground skid 37 may be provided beneath that bumper. This ground skid, in cooperation with a ground skid 38 adjacent the forward end of the frame member 2 maintains the straightening arrangement in its operative position. As seen best in Fig. 4, this straightening arrangement projects forwardly beyond any other portion of the machine so as to first contact a bale or other load if that load is disposed at an unadvantageous angular position relatively to the path of travel of the loading machine. As indicated at 39, the forward portion of the straightening arrangement is curved outwardly so as to better turn a bale inwardly toward the conveyor.

On the opposite side of the machine a drag link 40 carrying a draw bar connection 41 at its front end is pivotally connected at its rear end as indicated at 42 to the side frame member 1 of the machine. A suitable pin and hole adjusting assembly, generally indicated by numeral 43, is provided so as to selectively vary the angle of the drag link 40 relatively to the frame member 1. Depending below the drag link 40 is a generally longitudinally extending bumper 44 having an outwardly flared forward end. Due to the angular disposition of the drag link, any bale on the inner side of the machine that may be out of line will be lined up by virtue of its sliding contact with the bumper 44.

With the foregoing description in mind, it will be noted that the instant invention effectively and properly positions a bale for pick-up purposes, regardless of the position of that bale on the ground initially. For example, if the bale should be directly in alignment, or substantially so, with the conveyor, but standing on one end, the bumper bar 29 will knock the bale down upon its side in position to be picked up. If the bale or other load is disposed angularly to the path of travel of the machine, but on the inside, that is near the power vehicle or transporting vehicle, the bumper bar 44 will straighten the bale. On the other hand, if a bale is disposed substantially at right angles to the path of travel on the machine and generally toward the outside of that path, the bale will be effectively turned so that its longitudinal axis substantially coincides with the path of travel of the machine by means of the bumper arrangement including the bumper bar 36. This is illustrated diagrammatically in Fig. 4 where a load is indicated at 45 in the form of a square bale, initially disposed on the ground at substantially right angles to the path of travel of the machine. It will be seen that the bumper bar 36 strikes the outer portion of this bale, and as the machine moves forward that bumper bar turns the bale inwardly to proper pick-up position. Preferably, the distance between the bumper 44 and the members 34 and 35 is greater than the expected length of a bale or similar load. It will thus be seen that the cooperation of the various bumper members will effectively position a bale in proper pick-up position at any and all times, without the need of manual help on the part of an operator, and without any stopping of motion of the machine.

In the event loads in the nature of round bales are to be picked up, a curvate bumper element 46 may be attached to the vertical bumper bar 36, as shown clearly in Fig. 3, although such an element is not essential, since the vertical bumper bar 36 will straighten a round bale as well as a square bale.

From the foregoing, it will be noted that the straightening means cooperating with the bumper frame pivotally mounted over the pick-up member insure the proper positioning and elevation of a bale, or other load, regardless of the position of that load relative to the machine. Consequently, the machine may be towed by a power vehicle alongside of a transport vehicle or in any equivalent arrangement, and bales continuously picked up at a rapid rate without any manual assistance from an operator, and without any need for ever stopping the machine.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an agricultural loading machine, a mobile frame, an inclined loading trough carried by said frame, means to elevate a load along said trough, a drag link extending forwardly of said trough and pivoted to one side of said frame, a load bumper carried by said drag link, means projecting from the side of said frame opposite said drag link, said means extending beyond the forward end of said drag link, and a bumper carried at the forward end of said means.

2. In an agricultural loading machine, a mobile frame, an inclined loading trough carried by said frame, means to elevate a load along said trough, a drag link extending forwardly of said trough and pivoted to one side of said frame, a load bumper carried by said drag link, a load straightening assembly projecting forwardly of said drag link on the opposite side of the frame, and a ground skid supporting said assembly at its forward end.

3. In an agricultural loading machine, a mobile frame, an inclined loading trough carried by said frame, means to elevate a load along said trough, a drag link pivotally connected to said frame at one side thereof, a horizontally extending load bumper on said drag link, supporting means extending forwardly of the opposite side of said frame, and a vertically disposed load bumper on said supporting means.

4. Load straightening means for a bale loader having a rigid mobile frame, an inclined loading trough pivotally carried by the frame, and means to elevate a bale along said trough, said straightening means including a bumper connected to each side of said frame extending forward thereof and of said trough, one of said bumpers extending forwardly well beyond the other, and one of said bumpers having a vertical axis and the other a horizontal axis, said trough being pivotal relatively to said frame and said bumpers.

5. In an agricultural loading machine, a rigid mobile frame, an inclined loading trough carried by said frame and pivotal relatively to said frame, means to elevate a load along said trough, a drag link extending forwardly of said trough and pivoted to one side of said frame, a load bumper carried by said drag link, and a load straightening assembly rigidly connected to the opposite side of said frame from the drag link and projecting forwardly beyond said drag link.

6. In an agricultural loading machine, a rigid mobile frame, an inclined loading trough carried by said frame, means to elevate a load along said trough, and load positioning means carried directly by said frame including a bumper forward of said trough and on each side thereof and one of which is rigid, one of said bumpers extending forwardly well beyond the other and the space between said bumpers being greater than the expected length of a load, said trough being pivotal relatively to said frame and said bumpers.

EVERETT H. APPEL.

(References on following page)

REFERENCES CITED

The following references are of record in the file of this patent:

UNITED STATES PATENTS

| Number | Name | Date |
|---|---|---|
| 930,719 | Battee | Aug. 10, 1909 |
| 986,717 | Johnson | Mar. 14, 1911 |
| 1,275,808 | Wentz | Aug. 13, 1918 |
| 1,853,253 | Bennett | Apr. 12, 1932 |
| 2,208,128 | Holbrook et al. | July 16, 1940 |
| 2,325,704 | Passa | Aug. 3, 1943 |
| 2,397,570 | Smoker | Apr. 2, 1946 |
| 2,409,143 | McElhinney et al. | Oct. 8, 1946 |
| 2,427,324 | Farr et al. | Sept. 9, 1947 |
| 2,430,734 | Raney et al. | Nov. 11, 1947 |
| 2,460,441 | Appel | Feb. 1, 1949 |
| 2,542,446 | Abel | Feb. 20, 1951 |

FOREIGN PATENTS

| Number | Country | Date |
|---|---|---|
| 606,825 | Germany | Dec. 11, 1934 |